(12) United States Patent
Hyde et al.

(10) Patent No.: US 12,203,840 B2
(45) Date of Patent: Jan. 21, 2025

(54) APPARATUS FOR TRANSMISSION OPTICAL MEASUREMENTS WITH A WINDOW IN AN OPAQUE SUBSTRATE

(71) Applicant: Cellular Highways Ltd., Royston (GB)

(72) Inventors: Sam Hyde, Royston (GB); Alex Zhukov, Royston (GB); Robyn Pritchard, Royston (GB); Gang Xiong, Royston (GB); Samson Rogers, Royston (GB)

(73) Assignee: Cellular Highways Ltd., Royston (GB)

(*) Notice: Subject to any disclaimer, the term of this patent is extended or adjusted under 35 U.S.C. 154(b) by 200 days.

(21) Appl. No.: 18/019,528

(22) PCT Filed: Aug. 5, 2021

(86) PCT No.: PCT/EP2021/071871
§ 371 (c)(1),
(2) Date: Feb. 3, 2023

(87) PCT Pub. No.: WO2022/029229
PCT Pub. Date: Feb. 10, 2022

(65) Prior Publication Data
US 2023/0288315 A1    Sep. 14, 2023

(30) Foreign Application Priority Data
Aug. 6, 2020 (EP) .................................. 20189934

(51) Int. Cl.
*G01N 15/14* (2024.01)
*G01N 15/1434* (2024.01)

(52) U.S. Cl.
CPC ..... *G01N 15/1484* (2013.01); *G01N 15/1434* (2013.01); *G01N 2015/1452* (2013.01)

(58) Field of Classification Search
CPC ........... G01N 15/1484; G01N 15/1434; G01N 2015/1452
See application file for complete search history.

(56) References Cited

U.S. PATENT DOCUMENTS

| 2005/0287696 A1 | 12/2005 | Dumais et al. |
| 2007/0202560 A1 | 8/2007 | Kikuchi et al. |

(Continued)

FOREIGN PATENT DOCUMENTS

EP     3501651 A1    6/2019

OTHER PUBLICATIONS

PCT Patent Application No. PCT/EP2021/071871 International Search Report and Written Opinion issued Oct. 22, 2021.

*Primary Examiner* — Jamil Ahmed
(74) *Attorney, Agent, or Firm* — Erise IP, P.A.

(57) ABSTRACT

A method of producing a microfluidic chip for use in flow cytometry, the method comprising the steps of providing an opaque substrate, a first surface of which is optically smooth for visible light providing a continuous transparent layer across said first surface by vapour deposition so as to provide conformal contact between the continuous transparent layer and the first surface of the substrate providing a flow channel bounded on a first side by the continuous transparent layer and etching an aperture in a second surface of the substrate extending to the first surface of the substrate so as to provide an optical path between said second surface and the flow channel wherein the continuous transparent layer is less reactive to the etching than the substrate.

20 Claims, 4 Drawing Sheets

(56) References Cited

U.S. PATENT DOCUMENTS

| | | |
|---|---|---|
| 2008/0095488 A1 | 4/2008 | Foquet et al. |
| 2010/0055673 A1 | 3/2010 | Agarwal et al. |
| 2014/0315288 A1* | 10/2014 | Miyamura ......... G01N 33/5094 29/428 |

* cited by examiner

A

B

C

A

B

APPARATUS FOR TRANSMISSION OPTICAL MEASUREMENTS WITH A WINDOW IN AN OPAQUE SUBSTRATE

RELATED APPLICATION

The present application is a national stage application under 35 U.S.C. § 371 of International Application No. PCT/EP2021/071871, filed Aug. 5, 2021, which claims priority to European Patent Application No. 20189934.1, filed Aug. 6, 2020. The above referenced applications are hereby incorporated by reference.

BACKGROUND

Transmission optical measurements are made in various types of instruments that measure optical properties of a sample, for example particle analysers such as flow cytometers. One such optical measurement is scattering of light at small angles, also known as "forward scatter" or FSC, which can be used as a measure of the size or identity of a cell. FSC is commonly used for differentiating types of cells with different light scattering properties, such as lymphocytes, monocytes and other types of blood cells.

It is often desirable to take measurements of a sample in a vessel having an opaque substrate. This vessel may, for example, be a fluid flow channel on a disposable chip, and the substrate may be silicon. An opaque substrate may have various advantages, such as the optical or other physical properties of the opaque substrate or the ease of processing the substrate using micro-electromechanical systems (MEMS) techniques to create channels, actuators, and other features.

The challenge when using an opaque substrate is that it is difficult to perform transmission optical measurements, since the light is blocked by the substrate. While it is also possible to make similar measurements on light reflected by the substrate, reflection measurements have disadvantages such as interference between the incident and reflected light, sensitivity to the angle of the reflection, or reliance on epi-illumination (illumination through the light collection lens).

A means of taking transmission optical measurements of a sample in a vessel having an opaque substrate is therefore needed.

SUMMARY OF THE INVENTION

According to a first aspect of the invention, a method of producing a microfluidic chip for use in flow cytometry is provided. The method comprises the steps of: providing an opaque substrate, a first surface of which is optically smooth for visible light; providing a continuous transparent layer across said first surface by vapour deposition so as to provide conformal contact between the continuous transparent layer and the first surface of the substrate; providing a flow channel bounded on a first side by the continuous transparent layer; and etching an aperture in a second surface of the substrate extending to the first surface of the substrate so as to provide an optical path between said second surface and the flow channel; wherein the continuous transparent layer is less reactive to the etching than the substrate.

A microfluidic chip produced according to this method allows for transmission optical measurements to be made, such as forward scattering measurements. Light incident on particles in the flow channel is able to pass through both the continuous transparent layer and the aperture without distortion, allowing for accurate measurements of those particles to be taken in transmission.

A particular benefit of this method is that, because the continuous transparent layer is in conformal contact with the first surface of the opaque substrate, said continuous transparent layer retains the characteristic of being optically smooth for visible light. This optical smoothness is then maintained during the etching owing to the continuous transparent layer being relatively inert to the etching when compared with the opaque substrate. The continuous transparent layer is therefore able to transmit an optical wavefront without distortion.

Another benefit of this method is that it allows for a microfluidic chip to be produced that has a thinner transparent layer than is possible using ordinary methods known from the prior art. Whereas these ordinary methods require the transparent layer to be robust enough to be handled separately from a substrate, because in the present the aperture is formed by an etching process to which the continuous transparent layer is relatively inert, it is possible to deposit the continuous transparent layer directly onto the opaque substrate. Consequently, the continuous transparent layer need not be self-supporting and can therefore be made thinner than was previously possible. This is particularly beneficial as it improves the optical smoothness of the layer, and it is also attractive because it means that it is easier to take advantage of the thermal and electrical properties of the substrate.

Furthermore, because the transparent layer is continuous and bounds a first surface of the flow channel, it can be used to seal in particles flowing through the flow channel. This means that there is no need to further treat the substrate to prevent particles leaving the flow channel through the aperture.

The vapour deposition of the continuous transparent layer preferably comprises thermal evaporation, which forms a smooth, high-density thin film of the required optical properties. It is also possible to create an optically smooth transparent layer in conformal contact with the opaque substrate using other vapour deposition techniques, such as sputtering or chemical vapour deposition, although thermal evaporation has the advantage that the material deposited is harder and more uniform. By making the continuous transparent layer harder it is more resistant to damage and is better able to withstand pressure in the flow channel, both of which allow the continuous transparent layer to be made thinner, while uniformity in this layer improves its optical properties.

While application of the etchant could be localised to a particular area of the second surface of the opaque substrate, the method preferably further comprises applying a resist layer to the second surface of the substrate prior to the etching. Typically, this resist layer is patterned so as to define the shape of the aperture formed during the etching. Preferably, this is achieved by using a photoresist as the resist layer, with the method further comprising photolithographic patterning of the resist layer prior to the etching.

The etching can include chemical etching, such as with aqueous potassium hydroxide solution, or reactive ion etching, such as deep reactive ion etching (DRIE), usually with sulphur hexafluoride gas as the etchant. DRIE has the advantage that the aperture can be made with vertical side walls. Sulphur hexafluoride is particularly suitable for etching a silicon substrate.

The preferred DRIE process used in embodiments of the first aspect of the invention is one in which the etching comprises alternating between two steps: a first step involving the application of a, typically gaseous, etchant; and a second step involving the application of a passivation layer. This two-step process is repeated multiple times to produce an aperture having vertical side walls. The passivation layer preferably comprises octafluorocyclobutane ($C_4F_8$) while, as has already been mentioned, the etchant preferably comprises sulphur hexafluoride ($SF_6$) gas. Octafluorocyclobutane is particularly suitable when sulphur hexafluoride is used to etch a silicon substrate.

As is explained further below, it is advantageous for the laser to have an elliptical focus. Therefore, in order to minimise the effects of diffraction at the edges of the aperture, it is preferable for the aperture to be elliptical in cross section. This could be achieved with, for example, a circular aperture, but an elliptical aperture will, in general, have a lower cross-sectional area, meaning that the transparent layer can be made thinner whilst still be able to withstand the pressures in the flow channel.

The aperture will typically have a width in the range from 10 microns (μm) to 1000 microns (μm). More preferably, the aperture has a width in the range from 40 μm to 300 μm. This width is measured through the centre of the aperture along the direction particles will flow in the flow channel, which is typically the shortest distance running through the centre of the aperture. For example, when the aperture is elliptical the width is measured along the minor axis.

The continuous transparent layer preferably has a thickness in the range of 100 nanometres (nm) to 10 microns (μm), and more preferably has a thickness in the range 0.3 μm to 4 μm.

Microfluidic chips produced according to embodiments of the first aspect having an opaque substrate comprising silicon are particularly suitable for use in flow cytometry, as silicon possesses advantageous physical properties. For example, silicon is simple to process using micro-electromechanical systems (MEMS) techniques to create channels, actuators, and other features.

A continuous transparent layer comprising silicon dioxide is advantageous when the opaque substrate comprises silicon, as silicon dioxide is resistant to many of the chemicals, such as potassium hydroxide or sulphur hexafluoride, that may be used to etch silicon. The optical properties of the continuous transparent layer are not, therefore, negatively affected when etching the aperture into a silicon substrate.

The opaque substrate is typically shaped such that its first surface is opposite and parallel to its second surface, such as in the form of a wafer.

A particularly preferable embodiment of the first aspect of the invention is described below.

Firstly, a polished silicon wafer with an optically smooth first (front) surface is provided. A continuous layer of silicon dioxide is then deposited as a thin film on the front surface of the silicon wafer using thermal evaporation. A DRIE process is then used to etch an aperture from a second (back) surface of the silicon wafer to its front surface.

This DRIE process comprises alternating between two stages: a first stage in which a sulphur hexafluoride ($SF_6$) gas is applied as an etchant; and a second stage in which octafluorocyclobutane ($C_4F_8$) is applied as a passivation layer.

Prior to the etching, a photoresist layer is applied to the back surface of the silicon wafer and photolithographic patterning of this photoresist layer is then used to define the shape of the aperture.

According to a second aspect of the invention, a microfluidic chip for use in flow cytometry is provided. The microfluidic chip comprises: an opaque substrate, a first surface of which is optically smooth for visible light; a continuous transparent layer extending across and in conformal contact with said first surface, the continuous transparent layer having a thickness in the range from 100 nanometres (nm) to 10 microns (μm); a flow channel bounded on a first side by the continuous transparent layer; and an aperture extending from a second surface of the substrate to the first surface of the substrate so as to provide an optical path between said second surface and the flow channel, the aperture having a width in the range from 10 microns (μm) to 1000 microns (μm).

The aperture will typically have a width in the range from 40 μm to 300 μm.

The aperture is typically elliptical in cross section in order to minimise the effects of diffraction of light at its edges. As explained above, the light used to take transmission measurements will typically be a laser having an elliptical focus, and the aperture is designed accordingly.

The transparent layer will typically have a thickness in the range from 0.3 μm to 4 μm.

The substrate will preferably comprise silicon for the reasons discussed above in relation to the first aspect. In further preferable embodiments, the continuous transparent layer will comprise silicon dioxide.

The first surface of the substrate will typically be opposite and parallel to the second surface of the substrate. For example, the opaque substrate may be in the form of a wafer.

BRIEF DESCRIPTION OF THE DRAWINGS

Embodiments of the invention will now be described, by way of example, with reference to the accompanying figures, in which.

DETAILED DISCUSSION

Figure 1:
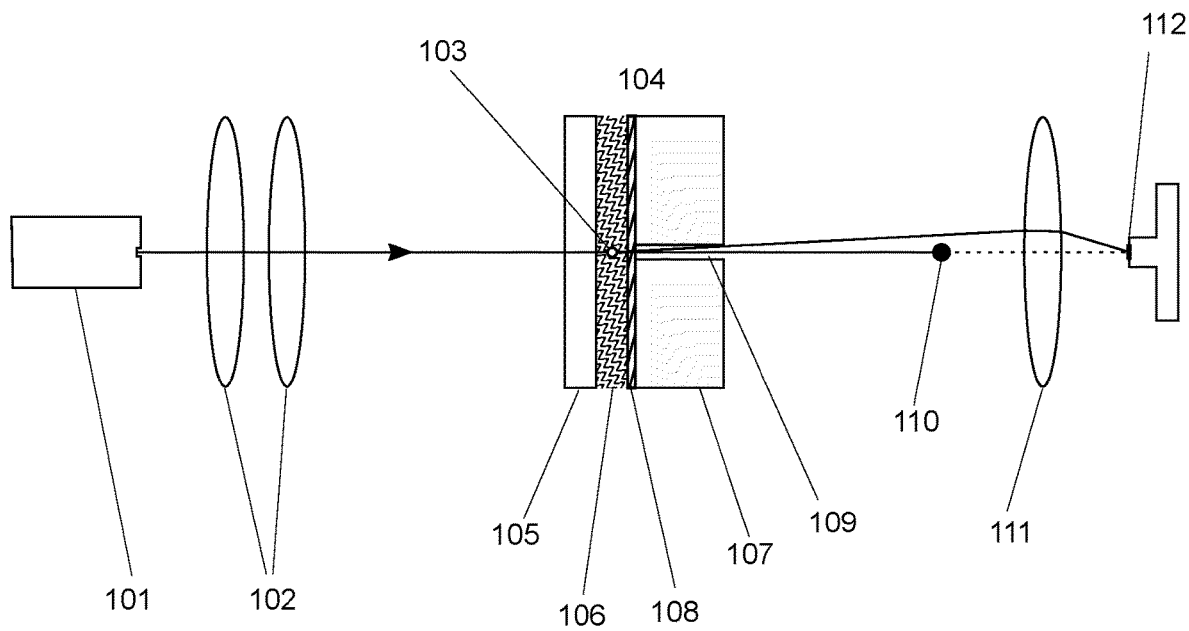
FIG. 1 shows an apparatus for transmission optical measurements in a flow channel.

An apparatus for transmission optical measurements on a sample is shown in FIG. 1. This embodiment makes FSC measurements of particles in a flow channel, or microchannel.

Light from a laser (101) passes through beam shaping lenses (102), such that an elliptical laser focus impinges on a sample (103) in a microfluidic chip (104). The microfluidic chip comprises a transparent channel layer (105), in which a flow channel is formed (106), in contact with a substrate (107), substrate (107) having a window layer, also referred to as a continuous transparent layer, on a first surface (108) and an aperture (109). The direct beam is blocked by a beam stop (110), while the scattered light is focused by a collection lens (111) onto a photodetector (112).

Figure 2:
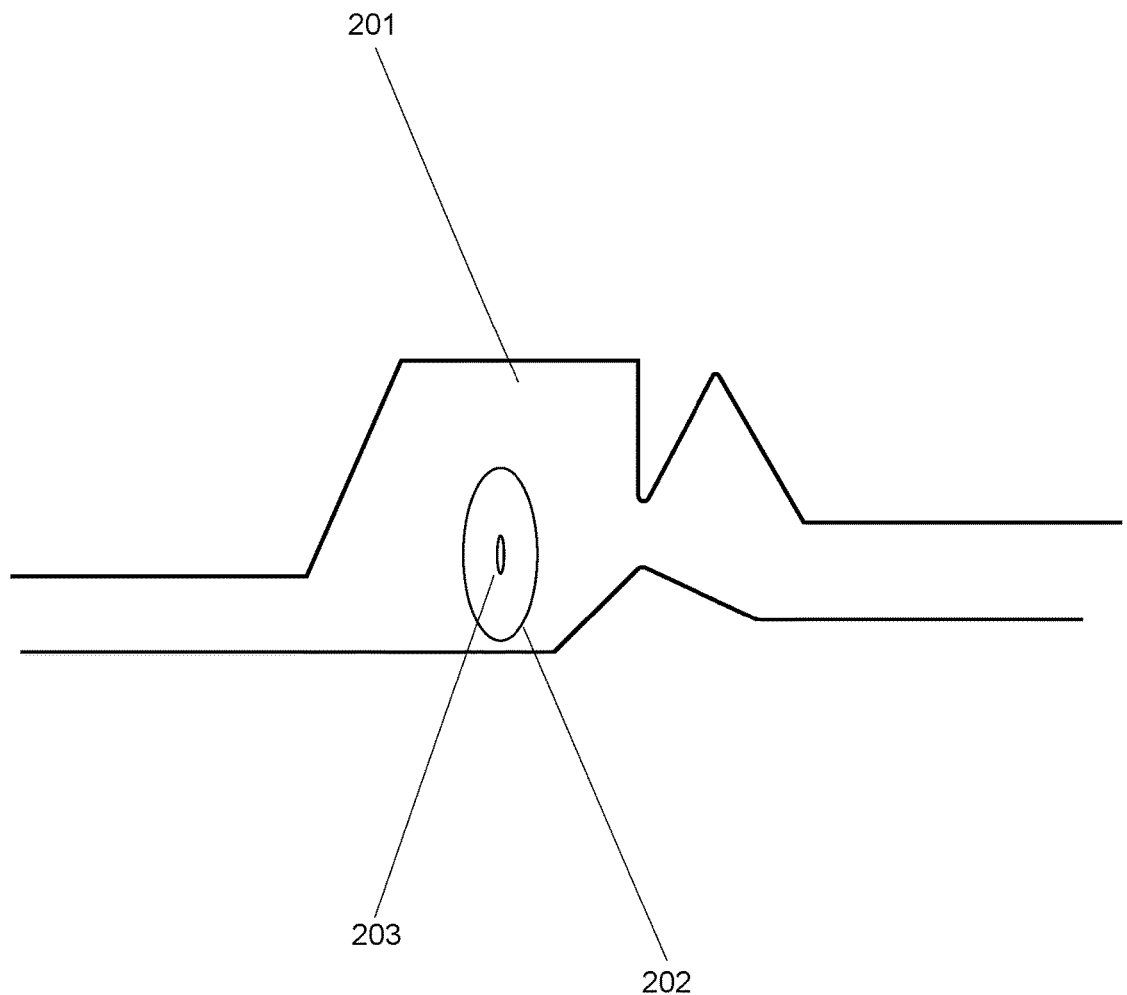
FIG. 2 shows a plan view of a flow channel with a window in the opaque substrate.

FIG. 2 shows the plan view of the flow channel (201), having an elliptical window (202) matching the shape of an elliptical laser focus (203). In this example, the elliptical beam measures 60×8 μm (widths along major and minor axes), while the window measures 200×90 μm. The elliptical laser focus dimensions are chosen as follows. The major width is chosen to be several times larger than a cell to be measured so that intensity variations are minimal across the width of a cell passing through the beam. For example, for 6 µm lymphocytes, a 60 µm width beam is ten times wider than each cell. The minor width is chosen to be approximately equal to the width of a cell to be measured, which is a trade-off between greater depth of focus (as minor width increases), and greater spatial resolution (as minor width decreases). The size of the elliptical window (202) is chosen to be significantly larger than the size of the laser focus (203) to avoid background light scattering by the edge of the aperture by diffraction. To this end, the window (202) is preferably at least two times larger than the laser focus (203) dimensions, and preferably at least three times larger, measured along each dimension. A device is therefore suitable for use with a wide range of different laser focus dimensions.

Figure 3:
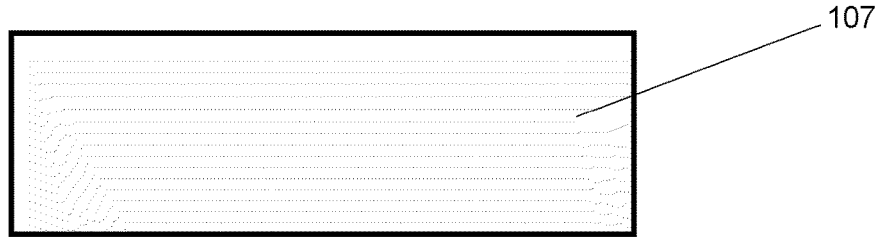
FIG. 3 shows a cross section view of window in the opaque substrate.
Figure 3:
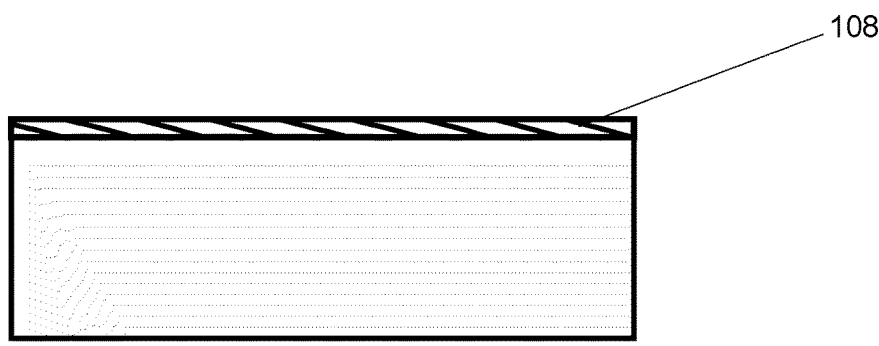
Figure 3:
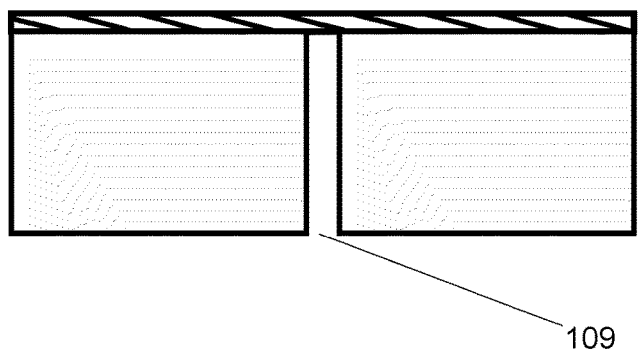

FIG. 3 shows the manufacturing process of a window in a, typically silicon, substrate (107). The process starts by providing a substrate, which is typically a polished silicon wafer, in Step A. In Step B, a window layer (108), usually of silicon dioxide, is then deposited on one side of the substrate (107). Alternative window layer materials are silicon nitride and aluminium oxide. Various processes may be used to deposit window layer (108) on substrate (107), the most preferred of which is thermal evaporation due to the high density and uniformity of the layer. Alternatives include chemical vapour deposition and sputtering. Finally, an aperture (109) is etched from the other side of the substrate (107) in step C. This is typically carried out as part of a deep reactive-ion etching (DRIE) process. The DRIE process comprises alternating between two stages multiple times. In the first stage, an etchant is applied, and in the second stage a passivation layer is applied to prevent further etching of the substrate (107). Prior to the DRIE process, a resist layer is applied to substrate to mask the areas of the substrate around the aperture from the etchant and thereby ensure that the substrate is only etched in the region forming the aperture. The resist layer is typically a photoresist which has been patterned by a photolithographic process. The DRIE process is, in some embodiments, performed with sulphur hexafluoride ($SF_6$) gas as the etchant and octafluorocyclobutane ($C_4F_8$) as the passivation layer.

In preferable embodiments, the substrate is a silicon wafer of thickness 500 µm and the thickness of the silicon dioxide layer is 3 µm, while the major and minor widths of the aperture are, respectively, 200 µm and 90 µm. The flow channel height is 37 µm. This allows a forward scattering light collection angle of up to 11°. Although the window layer is a thin film, it sustains a static pressure of several bar. These dimensions are only an example: a skilled person may design the dimensions for any desired forward scattering angle, and calculate the maximum pressure loading of the window layer based on the plate-bending equations and a value for the tensile strength of the window layer material.

A preferable minimum thickness twin of the window layer can be calculated based on the minor width of the required aperture w, the required burst pressure P, the yield stress of the window layer material T:

$$t_{min} \approx \sqrt{\frac{3Pw^2}{16T}}$$

So, for example, to use a silicon dioxide layer (yield stress 34 MPa) to resist a pressure of 0.5 bar, where the minor width of the aperture is 90 µm, the minimum thickness is approximately 1.5 µm. By contrast, using the preferred thickness of the window layer of 3 µm resists a pressure of up to around 2 bar.

Figure 4:
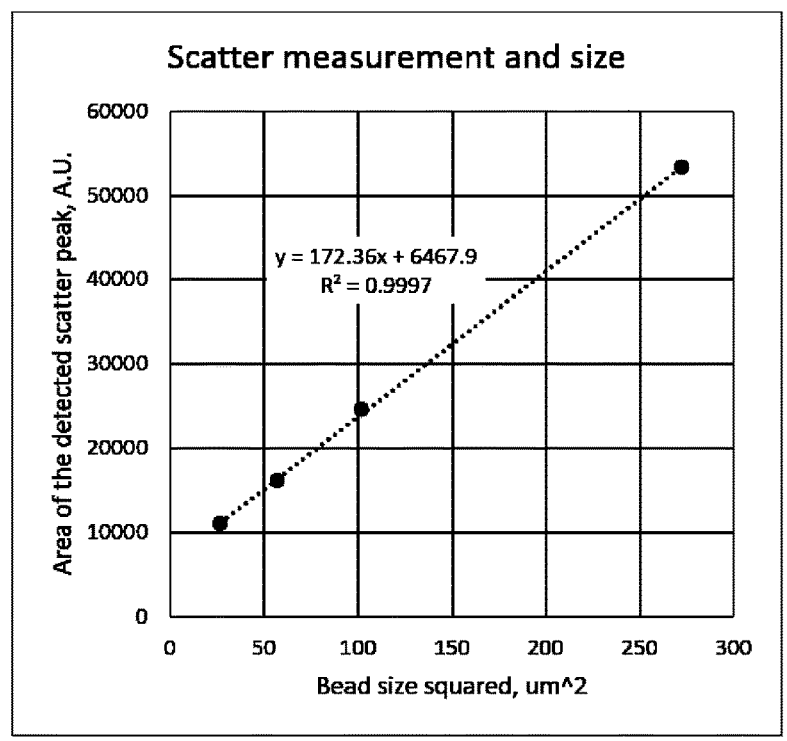
FIG. 4 shows measurements of FSC from calibration beads made through an example window.
Figure 4:
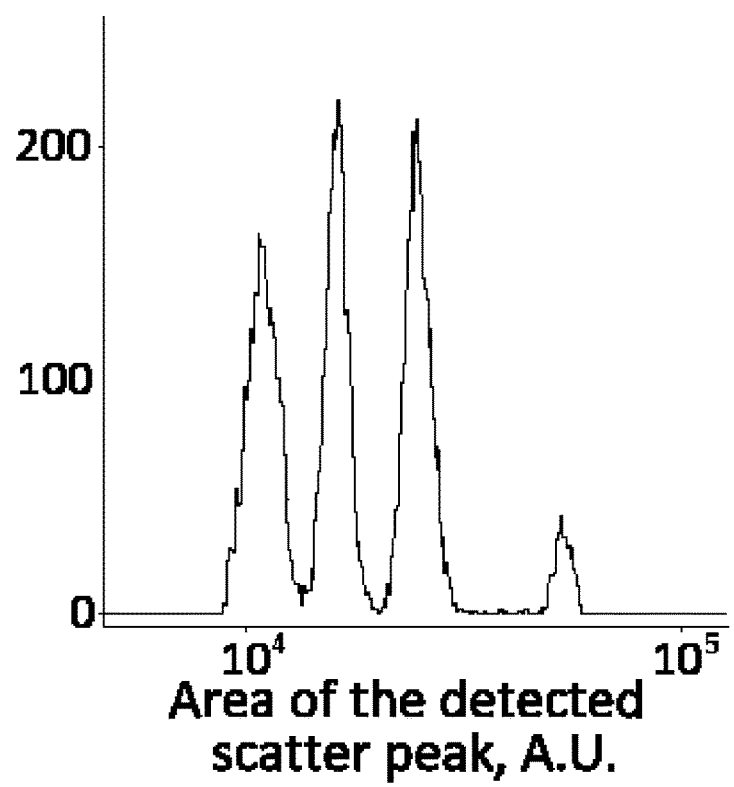

FIG. 4 shows measurements of FSC from calibration beads using the above apparatus. When taking forward scatter measurements using calibration beads, the beads are typically monodisperse, which is to say that they are all of the same size. The calibration bead sizes shown in FIG. 4 are 5.16, 7.56, 10.1 and 16.5 µm and are made of polystyrene. The mean area of the forward scatter peak (FSC-A) is plotted against the bead size squared (A), where AU stands for arbitrary units. This shows the correct scaling behaviour for forward scattering as a function of particle size, which is to say that FSC-A is proportional to the square of particle size.

The area of the forward scatter peak will vary between beads partly as a result of polydispersity in the calibration beads, polydispersity being non-uniformity in size. Although calibration beads are typically monodisperse, some degree of polydispersity is often unavoidable. Scattering of light at the edges of the aperture will lead to a background signal in the forward scatter measurements taken using the calibration beads. It is therefore desirable to minimise the effect of scattering of light at the edges of the aperture so as to ensure uniformity of forward scattering measurements. Likewise, if the measurements taken using monodisperse calibration beads are highly uniform then this indicates that measures of forward scatter made through the window are reliable.

A histogram is presented (B) showing that the coefficient of variation (CV), also known as relative standard deviation, of FSC from each bead component is around 7%. Polydispersity in the calibration beads is estimated to lead to a CV of around 5%, and other sources of variability contribute variability of only around 2%. These data show that reliable measurements of forward scatter at high-precision can be made through the window.

It will be understood that the invention has been described in relation to its preferred examples and may be modified in many different ways without departing from the scope of the invention as defined by the accompanying claims.

In alternative embodiments, other transmission optical measurements may be made on the sample, such as fluorescence measurement, attenuation or imaging.

In further alternative embodiments, other vessels may be provided on the substrate in addition to the flow channel, or other designs of flow channels may be used.

In further alternative embodiments, other substrate materials or window materials may be used or other subtractive fabrication processes.

It will be understood that the word 'etching' describes any subtractive fabrication process, and the phrase 'etch stop' describes any material which resists the etching process due to its chemical property of being relatively inert in an etchant that reacts with the substrate.

The invention claimed is:

1. A method of producing a microfluidic chip for use in flow cytometry, the method comprising:
   providing an opaque substrate, a first surface of which is optically smooth for visible light;
   providing a continuous transparent layer across said first surface by vapour deposition so as to provide conformal contact between the continuous transparent layer and the first surface of the opaque substrate;
   providing a flow channel bounded on a first side by the continuous transparent layer; and etching an aperture in a second surface of the opaque substrate extending to the first surface of the opaque substrate so as to provide an optical path between said second surface and the flow channel;
wherein the continuous transparent layer is less reactive to etching than the opaque substrate.

2. The method according to claim 1, wherein said vapour deposition comprises thermal evaporation.

3. The method according to claim 1, the method further comprising applying a resist layer to the second surface of the opaque substrate prior to etching.

4. The method according to claim 3, wherein the resist layer comprises a photoresist and the method further comprises photolithographic patterning of the resist layer prior to the etching.

5. The method according to claim 1, wherein etching comprises reactive-ion etching.

6. The method according to claim 5, wherein the etching comprises deep reactive-ion etching.

7. The method according to claim 6, wherein the etching comprises repeating a two-stage etching process multiple times, wherein a first stage comprises applying an etchant and a second stage comprises applying a passivation layer.

8. The method according to claim 7, wherein the etchant comprises sulphur hexafluoride and the passivation layer comprises octafluorocyclobutane.

9. The method according to claim 1, wherein a width of the aperture is between 10 microns (μm) to 1000 microns (μm), and is preferably between 40 μm to 300 μm.

10. The method according to claim 1, wherein the aperture is elliptical in cross section.

11. The method according to claim 1, wherein a thickness of the continuous transparent layer is between 100 nanometres (nm) to 10 microns (μm), and is preferably between 0.3 μm to 4 μm.

12. The method according to claim 1, wherein the opaque substrate comprises silicon.

13. The method according to claim 12, wherein the continuous transparent layer comprises silicon dioxide.

14. A microfluidic chip for use in flow cytometry, the microfluidic chip comprising:
an opaque substrate, a first surface of which is optically smooth for visible light;
a continuous transparent layer extending across and in conformal contact with said first surface, the continuous transparent layer having a thickness between 100 nanometres (nm) to 10 microns (μm);
a flow channel bounded on a first side by the continuous transparent layer; and
an aperture extending from a second surface of the opaque substrate to the first surface of the opaque substrate so as to provide an optical path between said second surface and the flow channel, the aperture having a width between 10 microns (μm) to 1000 microns (μm).

15. The microfluidic chip according to claim 14, wherein the aperture is elliptical in cross section.

16. The microfluidic chip according to claim 14, wherein the width of the aperture is between 40 μm to 300 μm.

17. The microfluidic chip according to claim 14, wherein the thickness of the continuous transparent layer is between 0.3 μm to 4 μm.

18. The microfluidic chip according to claim 14, wherein the opaque substrate comprises silicon.

19. The microfluidic chip according to claim 18, wherein the continuous transparent layer comprises silicon dioxide.

20. The microfluidic chip according to claim 18, wherein the first surface is opposite and parallel to the second surface.

* * * * *